April 23, 1929.  C. C. FARMER  1,709,906
UNLOADING DEVICE FOR COMPRESSORS
Filed Sept. 12, 1927
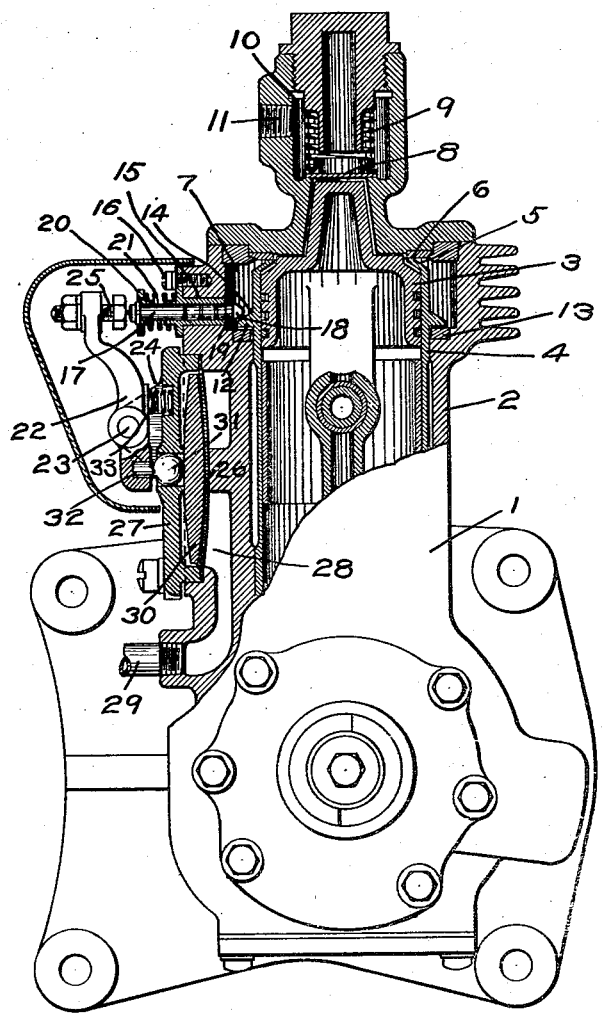
INVENTOR
CLYDE C. FARMER
BY Wm. M. Cady
ATTORNEY Patented Apr. 23, 1929.

1,709,906

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

UNLOADING DEVICE FOR COMPRESSORS.

Application filed September 12, 1927. Serial No. 218,924.

This invention relates to fluid compressors of the type having a sleeve inlet valve.

The principal object of my invention is to provide an unloading device adapted more particularly for a compressor of the above type.

In the accompanying drawing, the single figure is an elevational view, partly in section, of a fluid compressor, with my improved unloading device applied thereto.

The fluid compressor 1, as shown in the drawing, is provided with a cylinder 2 containing a piston 3, which is adapted to reciprocate in a sleeve or liner 4. The sleeve is moved up and down by the ring friction of the usual piston rings of the piston 3. The upper end of the sleeve 4 is provided with a valve portion 5, which is adapted to engage a seat member 6 and thereby serve as an inlet valve for controlling the supply of air from chamber 7, which is open to the atmosphere, to the space above the piston 3. A discharge valve 8, subject to the pressure of a coil spring 9, prevents back flow of fluid compressed by the compressor, and the compressed fluid, flowing past the valve 8, to chamber 10, is discharged through opening 11 into the usual storage reservoir (not shown).

The sleeve 4 adjacent to its upper end, is provided with an annular flange 12, having a lower face adapted to engage a cushion ring 13 and an inclined upper face 14. In a radially extending opening through the cylinder wall adjacent to the flange 12 is mounted a bushing 15, which is secured to the cylinder by a headed screw 16 and mounted to reciprocate in said bushing is a locking pin 17 having a conical end portion 18 adapted to engage the inclined face 14 of the flange 12.

The pin 17 is provided with a shoulder 19 which is adapted to engage the end face of the bushing 15 and thereby limit the outward movement of the pin. The outer end of the pin 17 carries a collar 20 between which and the bushing 15 is mounted a coil spring 21 which urges the pin outwardly.

A rocker arm 22 is pivotally mounted on a pin 23 carried by lugs 24 secured to the compressor cylinder and one end of the arm is provided with an adjustable headed screw 25, adapted to engage the outer end of the pin 17.

A flexible diaphragm 26 is clamped to the cylinder by a cover plate 27, the chamber 28 formed at one side is connected to a pipe 29. A follower plate 30 engages the opposite side of the diaphragm and a ball 31 engages said plate. A pin 32 is carried by the lower end of the arm. A spring 33 is interposed between the arm 22 and the cover plate 27 and urges the pin 32 into engagement with the ball 31.

A compressor governor device (not shown) of any desired type, is connected to pipe 29 and is adapted, when the pressure of fluid compressed by the compressor exceeds a predetermined degree, to supply fluid under pressure through pipe 29 to chamber 28 and when the pressure compressed by the compressor has been reduced to a predetermined degree, to vent fluid from the chamber 28.

In operation, when the pressure in the storage reservoir (not shown) is less than a predetermined degree, the compressor governor (not shown) is in its cut-out position with the chamber 28 connected to the atmosphere. The diagram 26 will then be in the position shown in the drawing and the rocker arm 22 will be held by spring 33, so that the pin 17 will be permitted to maintain its outer position, in which a clearance space exists between the inclined face 14 of the flange 12 and the conical end 18 of pin 17.

The sleeve 4 can therefore move back and forth by operation of the piston 3 and consequently fluid is compressed by the compressor and flows past the discharge valve 8 to chamber 10 and thence through outlet 11 to the usual storage reservoir (not shown).

When the pressure in the storage reservoir has been increased to a predetermined degree, the compressor governor operates to supply fluid under pressure to chamber 28 and thereby the diaphragm 26 is operated to cause the arm 22 to be rocked and the pin 17 to be moved inwardly, so that the conical end 18 thereof, engages the inclined face 14 of the flange 12. The sleeve 4 is then held from movement, with the flange 12 in engagement with the cushion ring 13.

The compressor now operates without load, since the inlet valve 5 cannot move to its seat.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a fluid compressor, the combination with a cylinder having a movable sleeve and a piston working in said sleeve, of a flange carried by said sleeve and having an inclined face, a pin having a conical end and movable so that the conical end engages said face, and means operated by fluid under pressure for operating said pin.

2. In a fluid compressor, the combination with a cylinder having a movable sleeve and a piston working in said sleeve, of a flange carried by said sleeve and having an inclined face, a radially movable pin having a conical end adapted to engage said face, a rocker arm for operating said pin, and a flexible diaphragm operated by an increase in fluid pressure for operating said arm to cause the conical end of said pin to engage the inclined face of said flange.

In testimony whereof I have hereunto set my hand.

CLYDE C. FARMER.